US010336271B2

(12) United States Patent
Palisse (10) Patent No.: US 10,336,271 B2
(45) Date of Patent: Jul. 2, 2019

(54) BUMPER BEAMS, ROCKER PANELS AND METHODS (71) Applicant: AUTOTECH ENGINEERING A.I.E., Amorebieta-Etxano (ES)

(72) Inventor: Richard Palisse, Bourg de Peage (FR)

(73) Assignee: AUTOTECH ENGINEERING A.I.E., Amorebieta-Etxano (ES)

( * ) Notice: Subject to any disclaimer, the term of this patent is extended or adjusted under 35 U.S.C. 154(b) by 300 days.

(21) Appl. No.: 15/115,895

(22) PCT Filed: Feb. 13, 2015

(86) PCT No.: PCT/EP2015/053128
§ 371 (c)(1),
(2) Date: Aug. 1, 2016

(87) PCT Pub. No.: WO2015/121430
PCT Pub. Date: Aug. 20, 2015

(65) Prior Publication Data
US 2017/0158151 A1 Jun. 8, 2017

(30) Foreign Application Priority Data

Feb. 14, 2014 (EP) ..................................... 14382049

(51) Int. Cl.
*B60R 19/18* (2006.01)
*B21D 53/88* (2006.01)
(Continued)

(52) U.S. Cl.
CPC .............. *B60R 19/18* (2013.01); *B21D 5/086* (2013.01); *B21D 39/038* (2013.01); *B21D 47/01* (2013.01);
(Continued)

(58) Field of Classification Search
CPC .................. B60R 19/18; B60R 19/023; B60R 2019/1813; B21D 5/086; B21D 39/038; B21D 47/01; B62D 53/88
See application file for complete search history.

(56) References Cited

U.S. PATENT DOCUMENTS 6,971,691 B1 12/2005 Heatherington et al.
2004/0130166 A1* 7/2004 Trancart .................. B60R 19/18
293/102
(Continued)

FOREIGN PATENT DOCUMENTS

DE 3927082 A1 3/1990
DE 102005034520 A1 1/2007
(Continued)

OTHER PUBLICATIONS

International Search Report and Written Opinion for PCT/EP2015/053128, dated Mar. 30, 2015, 9 pp.

*Primary Examiner* — D Glenn Dayoan
*Assistant Examiner* — Melissa A Black
(74) *Attorney, Agent, or Firm* — Squire Patton Boggs (US) LLP (57) ABSTRACT

The present disclosure relates to bumper beams having a closed cross-section, the closed cross-section being formed by one or more metal plates. The metal plates include a plurality of holes and a plurality of projections, wherein the projections engage with corresponding holes to retain the closed cross-section. The present disclosure further relates to rocker panels having a closed cross-section, the closed cross-section being formed by one or more metal plates, and the metal plates including a plurality of holes and a plurality of projections, wherein the projections engage with corresponding holes to retain the closed cross-section. The pres- (Continued)

ent disclosure further relates to methods of manufacturing such bumper reinforcing members and rocker panels.

13 Claims, 12 Drawing Sheets

(51) Int. Cl.
*B60R 19/02* (2006.01)
*B21D 47/01* (2006.01)
*B21D 5/08* (2006.01)
*B21D 39/03* (2006.01)

(52) U.S. Cl.
CPC ............ *B21D 53/88* (2013.01); *B60R 19/023* (2013.01); *B60R 2019/1813* (2013.01)

(56) References Cited

U.S. PATENT DOCUMENTS

| | | |
|---|---|---|
| 2008/0217934 A1 | 9/2008 | Hori et al. |
| 2012/0074720 A1 | 3/2012 | Johnson et al. |

FOREIGN PATENT DOCUMENTS

| | | |
|---|---|---|
| FR | 2918017 A1 | 1/2009 |
| JP | 2002087186 A | 3/2002 |

* cited by examiner

BUMPER BEAMS, ROCKER PANELS AND METHODS

This application claims the benefit of European Patent Application EP 14382049.6 filed on Feb. 14, 2014

The present disclosure relates to bumper beams and methods for manufacturing bumper beams. The present disclosure further relates to rocker panels and suitable manufacturing methods.

BACKGROUND

Vehicles such as cars usually incorporate front and/or rear bumpers made of plastic with an inner metal reinforcing cross-member. Reinforcing cross-members or beams of different shapes (curved or straight) and of different cross-sections are known. The cross-sections may be open or closed. A closed cross-section generally provides greater stiffness to the elongated body than an open cross-section does.

Bumper beams are generally joined to the structure of the vehicle by means of impact absorbers, which are designed to deform in the event of impact absorbing the greatest possible amount of energy.

Bumper beams of closed cross-section may be formed out of a single metal plate (blank) which is deformed such as to form a substantially closed cross-section. One side of the metal plate may then be joined to another side. Alternatively, two metal plates may be deformed and then joined.

US 2008/217934 discloses a bumper beam including two tubular bodies formed by tube hydroforming that extend left and right. The tubular bodies are joined to each other in a parallel state. The tubular bodies each have a rectangular vertical cross-section shape including top and bottom and front and rear sides. The tubular bodies are disposed in a line from top to bottom, and opposing surfaces thereof are joined together across the entire length in the longitudinal direction.

JP 2002 087186 discloses a bumper beam for automobile formed in a tubular structural body without requiring a welding process and having an impact resistance. This bumper beam 1 comprises a front piece 1a, an upper piece 1d connected to the upper end of the front piece 1a, an upper intermediate piece 1e positioned on the lower side of the upper piece 1d, an upper side joint piece 1f connecting the rear end of the upper piece 1d to the rear end of the upper intermediate piece 1e, a lower piece 1g connected to the lower end part of the front piece 1a, a lower intermediate piece 1h positioned on the upper side of the lower piece 1g, and a lower side joint piece 1i connecting the rear end of the lower piece 1g to the rear end of the lower intermediate piece 1h.

DE102005034520 discloses a unit (1) which comprises a transversally positioned u-profile (3) accommodating the front ends of two carrying elements (5) in the space between the outer segments (7,8). The carrying elements (5) have a square cross section and are assembled of a c-profile (11) and a flat bar (12) inserted between the edges of the outer segments of the profile (11). The edges of the profile (11) are provided with rows of hook-shaped extensions to be engaged with a row of slots positioned along the edges of the flat bar (12)

Vehicles such as cars may further contain rocker panels that are located below the vehicle doors. The rocker panels may cover the sides of the vehicle frame and may be covered by a rocker molding. They may sometimes be referred to as sills.

Rocker panels usually have a closed cross-section formed by two separate metal blanks. These blanks may be of different materials. The rocker panels may comprise an internal reinforcement member.

Both in the case of rocker panels and in the case of bumper beams joining may include welding, such as e.g. spot welding or laser beam welding. Such welding processes may be continuous or discontinuous i.e. in discrete points. Depending on the welding method chosen, the speed of manufacturing, the cost of manufacturing and the quality of the joint may be affected. Discontinuous spot welding e.g. requires an overlap of material.

SUMMARY

In a first aspect, a bumper beam having a closed cross-section is provided. The closed cross-section is formed by one or more metal plates. The metal plates comprise a plurality of holes and a plurality of projections, wherein the projections engage with corresponding holes to retain the closed cross-section.

In accordance with this aspect, the closed cross-section provides a relatively high stiffness. At the same time, a bumper beam is provided that may be relatively quickly and cheaply manufactured because no welding step is necessary. Additionally, higher tolerances may be allowed in the mechanical joining process as compared to a welding process.

In some examples, the closed cross-section may be formed by a single metal plate. In other examples, the closed cross-section may be formed by a combination of two metal plates. If two metal plates are used, they may have different structural properties, e.g. because they are of different materials or different thicknesses. Using two metal plates, characteristics of the reinforcing cross-member may be optimized locally according to local requirements.

In some examples, one or more of the plurality of projections extend through the corresponding holes and wherein a portion of the projections extending through the corresponding holes is bent. Bending the portion of the projection that extends through the hole may improve the strength of the joint. Bending may be performed such that the projection lies against a wall of the closed cross-section. In some examples, the projection may be bent in an alternating manner, some of the projections being bent in a first direction and the other projections being bent in the opposite direction.

In some examples, the closed cross-section may be substantially rectangular. In other examples, the closed cross-section may be substantially "eight"-shaped. In yet further examples, the closed cross-section may have two separate substantially rectangular portions. Depending on the type of vehicle and the corresponding structural requirements, the size and also the cross-sectional shape of a reinforcing cross-member may vary. All these different cross-sections may conveniently be manufactured with a mechanical joint as explained herein.

Substantially rectangular, and substantially eight-shaped throughout this disclosure should be interpreted as approaching a rectangular shape or an "8" shape, but allowing for deviations from this shape due to e.g. local bends, fillets, reinforcements and other local deviations from such a shape.

In another aspect, the present disclosure provides a bumper comprising a bumper beam according to any of the examples disclosed herein. And in a yet further aspect, the present disclosure provides a vehicle comprising such a bumper.

In yet a further aspect, the present disclosure provides a method of manufacturing a bumper beam according to any of the examples disclosed herein. The method comprises providing one or more metal plates, forming a plurality of holes and forming a plurality of projections, forming the metal plates to achieve a substantially closed cross-section, and introducing the plurality of projections into the plurality of holes.

In accordance with this aspect, a relatively quick, low cost and high reliability method of manufacturing is provided.

In yet a further aspect, the present disclosure provides a rocker panel having a closed cross-section. The closed cross-section is formed by one or more metal plates. The metal plates comprise a plurality of holes and a plurality of projections, wherein the projections engage with corresponding holes to retain the closed cross-section.

In accordance with this aspect, a rocker panel is provided that may be relatively quickly and cheaply manufactured because no welding step is necessary.

In some examples, the closed cross-section of the rocker panel may be formed by a first and a second metal plate, the first metal plate comprising the plurality of holes and the second metal plate comprising the plurality of projections. Alternatively, the closed cross-section may be formed by a first and a second metal plate, the first and the second metal plate both comprise a plurality of holes and a plurality of projections. The metal plates may have different structural properties, e.g. they may have a different thickness or may be made of a different material.

In some examples, a rocker panel may comprise an inner reinforcement to improve structural strength and/or stiffness. In some of these examples, the inner reinforcement may be formed by an inner metal plate, the inner metal plate comprising a plurality of holes and/or a plurality of projections, and the inner metal plate may be joined to the other metal plates by engagement of the holes and/or projections of the inner metal plate with the projections and/or holes of the other plates. In these examples, also the inner reinforcement member may be joined to one or both metal plates by a mechanical joint rather than a weld joint.

In another aspect, the present disclosure provides a vehicle comprising a rocker panel according to any of the examples disclosed herein.

In yet a further aspect, the present disclosure also provides a method of manufacturing a rocker panel, comprising providing a first metal plate and a second metal plate, forming a plurality of holes in the first metal plate and forming a plurality of projections in the second metal plate, forming the metal plates such that when they are joined a substantially closed cross-section is achieved, and introducing the plurality of projections into the plurality of holes.

BRIEF DESCRIPTION OF THE DRAWINGS

Non-limiting examples of the present disclosure will be described in the following, with reference to the appended drawings, in which.

DETAILED DESCRIPTION

Figure 1A:
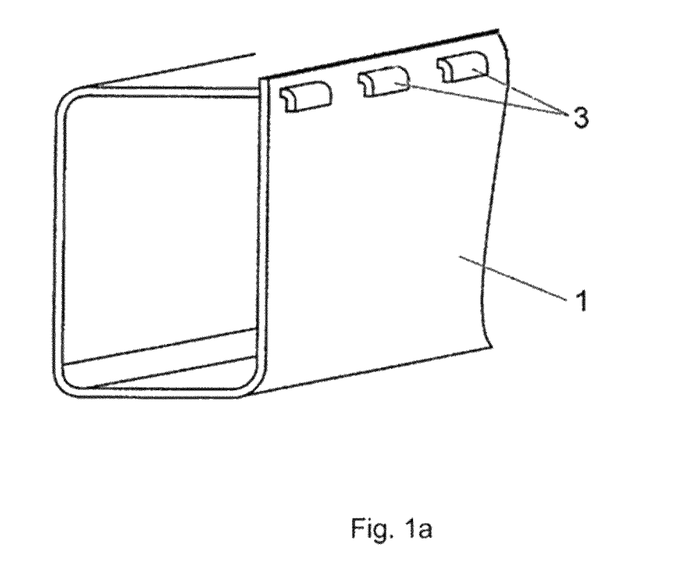
FIG. 1a schematically illustrates a three-dimensional view of a portion of an example of a bumper beam.
Figure 1B:
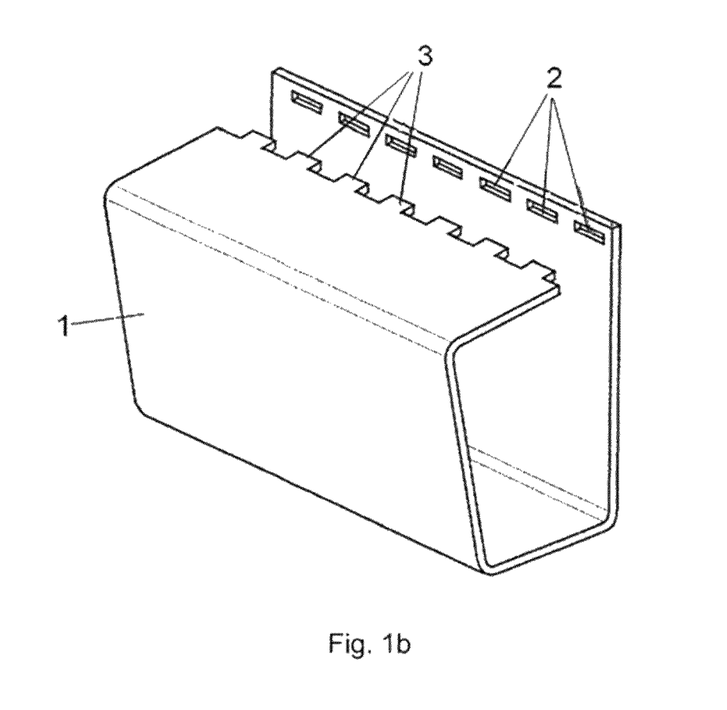
FIG. 1b schematically illustrates another three-dimensional view of the same portion.

FIGS. 1a and 1b schematically illustrate three-dimensional views of a portion of an example of a cross-member of a bumper, a "bumper beam". A beam may be formed from a single plate 1 which is formed such as to have a substantially closed cross-section. The plate 1 may be of e.g. steel, in particular an ultra-high strength steel. Alternatively, another metal such as aluminium could be used.

Holes 2, in this example in the form of substantially rectangular windows may be provided in the plate (see in particular FIG. 1b). On the other hand, also projections 3 may be provided in the plate. The projections may be provided along an edge region of plate 1, whereas the holes may be provided in a region close to an opposite edge of the plate. The projections in this case are shown to be substantially rectangular tabs.

The shapes and sizes of the holes (windows) and projections (tabs) may be substantially complementary. I.e. the windows may have a length that corresponds substantially to the width of tabs 3. They may be slightly longer. The windows may further have a width that substantially corresponds to a thickness of the tab (i.e. of the thickness of the plate). They may be slightly wider. This way a suitable and easy engagement of holes and projections may be enabled.

After introduction of the projections into the holes, the portions of the projections extending through the holes may be deformed. This may ensure a proper joining of the projections and holes and a proper "locking" of the closed-cross-section. For example, these portions of the projections may be bent. In the example of FIG. 1a, the projections are all bent in the same direction.

Figure 2A:
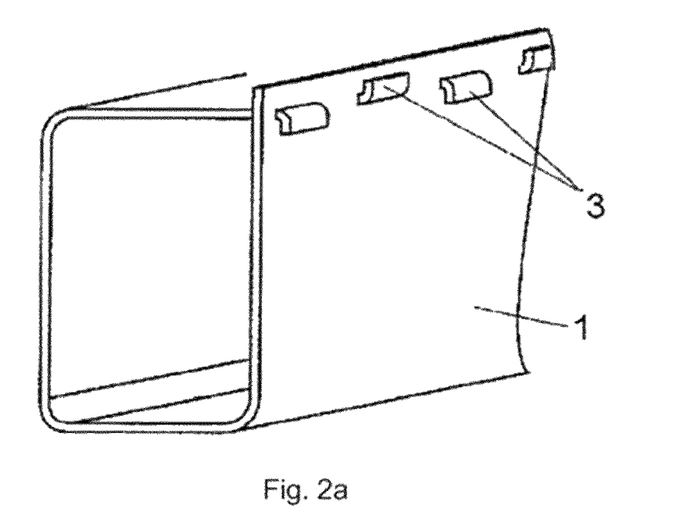
FIGS. 2a-2c schematically illustrate examples of deformation of projections which may be employed in example bumper beams and example rocker panels.
Figure 2B:
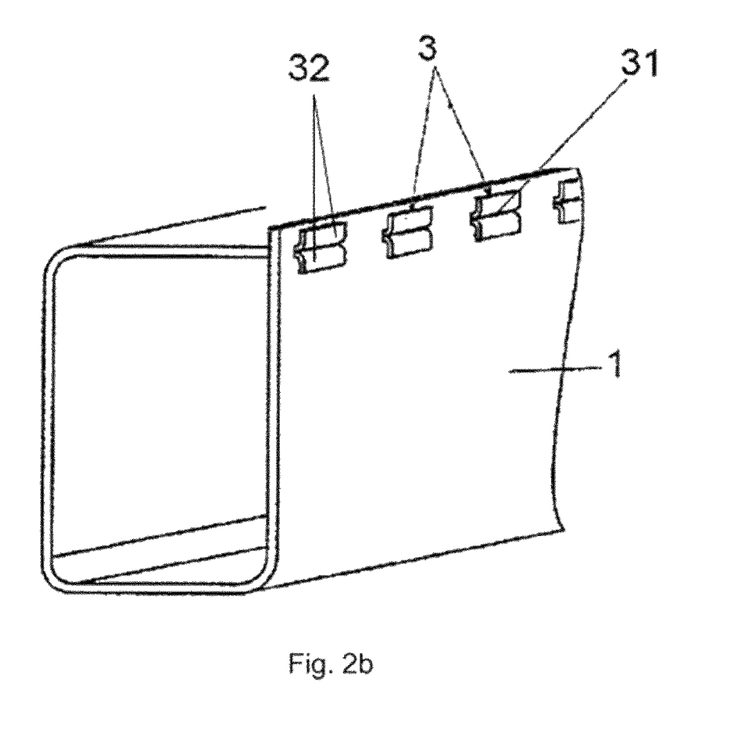

In an alternative example of FIG. 2a, in an alternating manner, some of the projections 3 may be bent in one direction (upwards) and other projections may be bent in the opposite direction (downwards). In another example, depicted in FIG. 2b, the projections may have a cut 31, according to a plane parallel to the surface of the projections, such that two tabs 32 may be defined. These tabs may be bent in opposite directions.

Figure 2C:
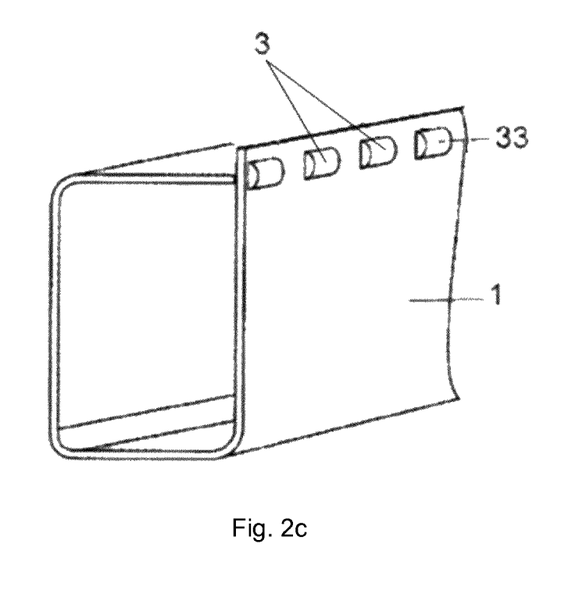

In yet a further example, schematically illustrated in FIG. 2c, the portions of the projections extending through the holes may be deformed in another manner, for example, in a rivet-like manner. The ends of the projections may be riveted onto the portions of the plate surrounding the holes. These ends may thus form lateral or vertical extensions 33 in order to lock the cross-section.

The projections and openings and methods for deforming the projections illustrated in these examples may be used in any of the examples of bumper beams and rocker panels illustrated herein.

Figure 3A:
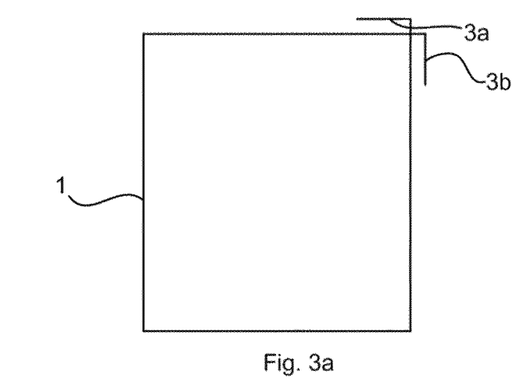
FIG. 3a schematically illustrates a cross-sectional view of another example of a bumper beam.
Figure 3B:
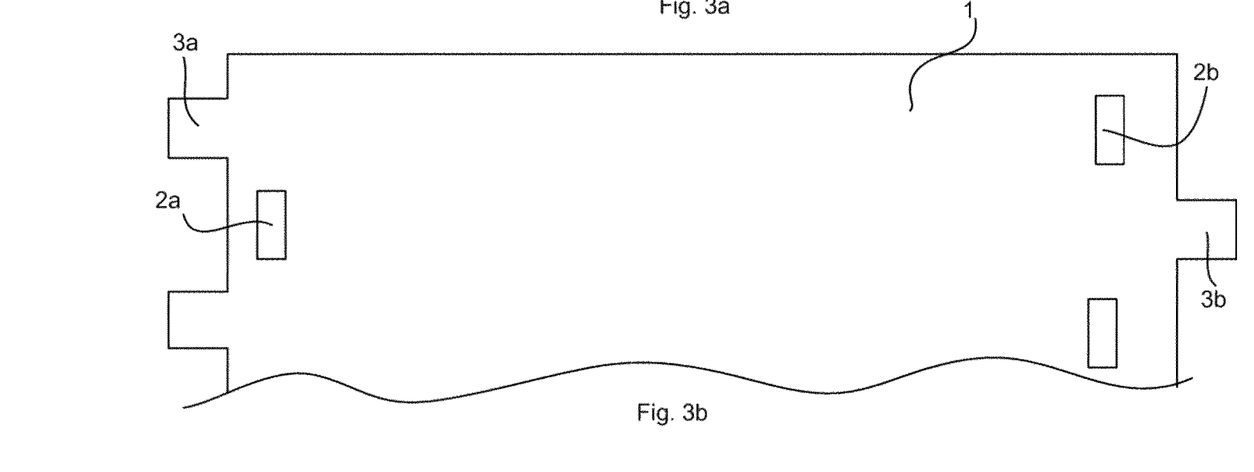
FIG. 3b schematically illustrates a top view of a continuous web of metal from which the example of a bumper beam of FIG. 3a may be formed.

FIG. 3a schematically illustrates a cross-sectional view of another example of a bumper beam, whereas FIG. 3b schematically illustrates a top view of a continuous web of metal from which the example bumper beam of FIG. 3a may be formed.

In the depicted example, the beam may be formed from a single sheet or plate. The metal plate 1 may have holes 2a and projections 3a at or near a first edge. The opposite edge of the metal plate may also comprise holes 2b and projections 3b. As the plate is formed into a closed cross-section which may be substantially rectangular, the projections 3a may be introduced into holes 2b and projections 3b may be introduced into holes 2a.

As may be seen in FIG. 3a, the projections 3a and 3b may then be deformed/bent to lie against outer walls of the closed cross-section.

The holes 2a and 2b are shown to be rectangular. Such holes may be formed by punching through the continuous metal web depicted in FIG. 3b. The projections 3a and 3b may be formed by cutting or milling portions of the edges of the continuous metal web such that the projections are left. Alternatively these edge portions to be removed may be removed by punching.

Figure 4A:
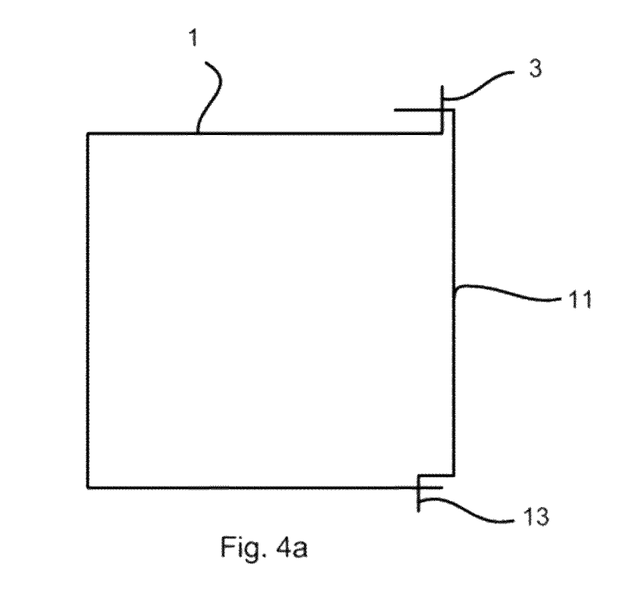
FIGS. 4a and 4b schematically illustrate cross-sections of other examples of bumper beams.
Figure 4B:
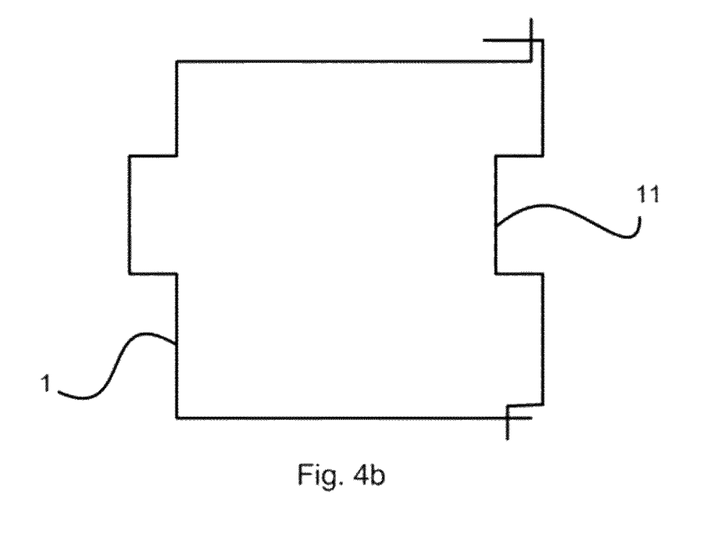

FIGS. 4a and 4b schematically illustrate cross-sections of other examples of reinforcing beams of bumpers. In the example of FIG. 4a, the beam may be formed by a first metal plate 1 and a second metal plate 11. The first metal plate may comprise projections 3 along a first edge region of the metal plate 1. Along a region of the opposite edge, the metal plate 1 may comprise holes.

The second metal plate 11 also comprises both holes and projections. Along a first edge, holes may be provided, and along an opposite edge projections 13 may be provided.

The first and second metal plates may be formed such as to complement each other to form a substantially closed cross-section, e.g. a substantially rectangular cross-section. In the example shown, a first metal plate 1 substantially covers three sides of the rectangle, whereas the second metal plate 11 substantially covers the remaining side of the rectangle. In another example, both metal plates each extend along two sides of a rectangle.

The projections 3 on an edge of the first metal plate may thus face an edge of the second metal plate comprising holes and the projections may thus be introduced into the holes. Also, the edge of the first metal plate comprising holes thus faces an edge of the second metal plate comprising the projections 13.

In an alternative, non-illustrated example, two edges of the first and the second metal plates may comprise both holes and projections.

FIG. 4b shows a similar example as the one shown in FIG. 4a. Again, a substantially closed rectangular cross-section may be formed by deforming two metal plates and a mechanical joint along edges of the plates facing each other. The mechanical joint again may be formed by the introduction of projections into holes.

FIG. 4b serves to illustrate that in accordance with specific requirements of a particular bumper implementation, small deviations such as e.g. a groove 11 and/or a corresponding protrusion with respect to a rectangle may be incorporated. Other possible deviations include fillets and local reinforcements such as folds. Such deviations or variations may relatively easily be formed at the same of forming the closed cross-section. Roll-forming may be used for forming metal plates into a desired shape, in particular in the case of continuous metal webs provided from a roll of metal sheet/plate.

Figure 5A:
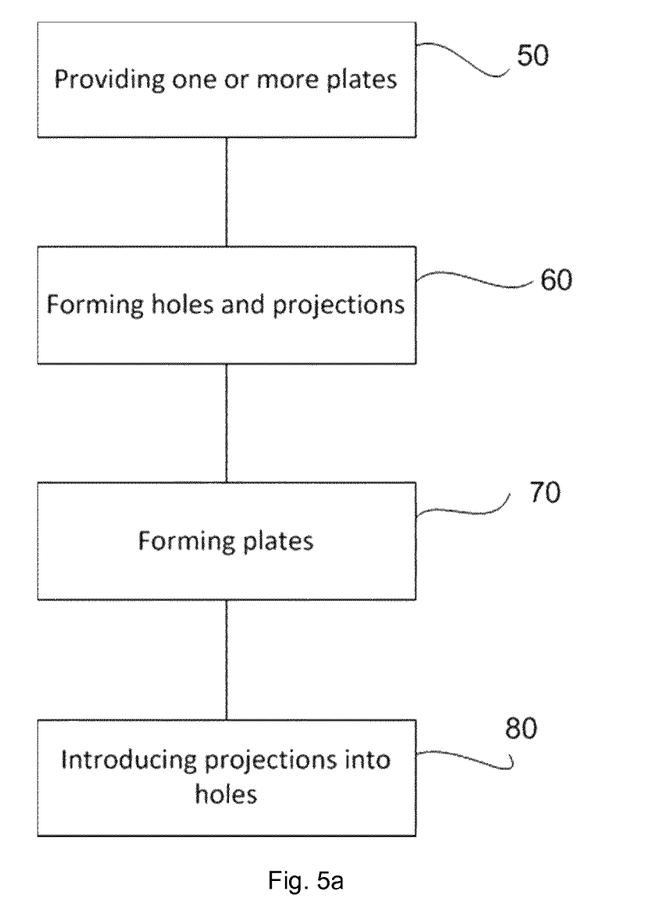
FIGS. 5a and 5b show block diagrams of examples of methods for forming bumper beams according to an implementation.
Figure 5B:
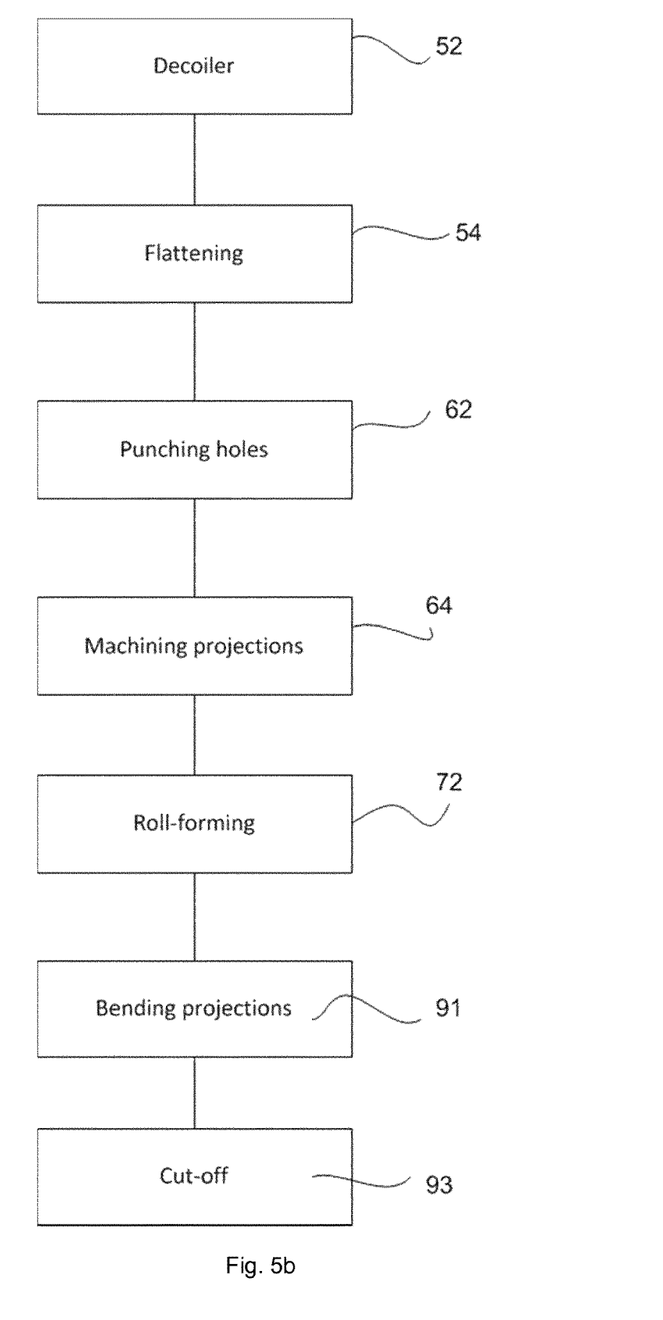

FIGS. 5a and 5b show block diagrams of examples of methods for forming bumper beams according to an implementation. In FIG. 5, at block 50, one or more plates may be provided. In particular, a single plate or two plates may be used. Holes and projections may be formed at block 60. The plates may be formed into an appropriate shape to form a closed cross-section at block 70. To give the beam its final shape, the projections may be introduced into the holes.

FIG. 5b illustrates a block diagram of another example. One or more plates may be provided from a roll of metal by decoiling at block 52. These plates may be flattened at block 54. At blocks 62 and 64, holes may be punched in the one or more plates and the projections may be formed. Punching the holes and machining the projections may take place one after another (in any order) or may take place substantially simultaneously.

At block 72, the one or more plates may be roll formed into a suitable shape such that a closed cross-section may result. Due to the roll forming, the projections may be introduced into corresponding holes. So that the achieved cross-section may be effectively maintained, the projections may be deformed e.g. bent at block 91 or riveted. At block 93, a suitable length of plate(s) may be cut-off from the continuous web.

A substantially straight bumper beam may result from this process. Depending on the implementation, the resulting beam may subsequently be bent to give the cross-member an appropriate curvature. Depending on the implementation, a bumper beam may be substantially straight or may be curved. The curvature may be varied along the length of the cross-member in some implementations.

Figure 6A:
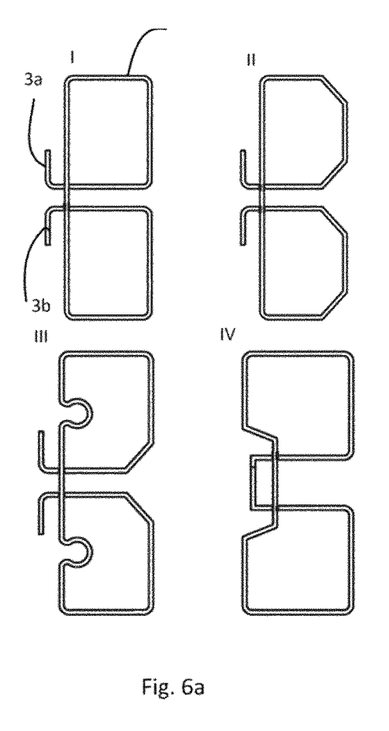
FIGS. 6a-6b schematically illustrate different views of an example of a bumper beam.
Figure 6B:
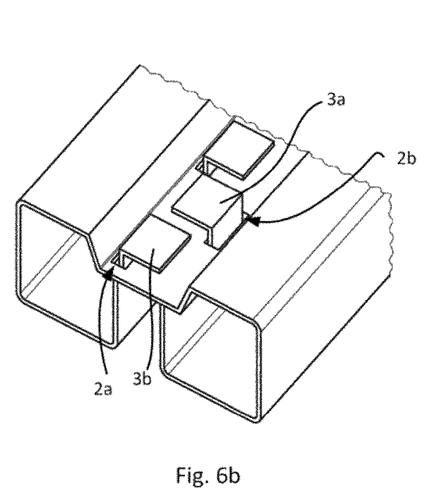

FIGS. 6a-6b schematically illustrate different views of an example of a bumper beam. In the example of FIGS. 6a and 6b, the beam may have a closed cross-section comprising two separate substantially rectangular cross-sections. In this example, a single metal plate may be used.

In FIG. 6a, four different examples of cross-sections of bumper beams I, II, III and IV. In these four examples, the resulting cross-sections correspond to two symmetrically arranged, separated substantially rectangular cross-sections. The various examples I, II, III and IV include minor variations with respect to rectangles, such as local protrusions, fillets or recesses. They are understood to be covered by the description of "substantially rectangular".

The cross-section of example II may also be described as substantially B-shaped.

FIG. 6b schematically illustrates a three-dimensional view of the bumper beam of example IV.

Projections 3a and 3b may be formed along opposite edges of the metal plate. Suitable holes 2a, 2b may be formed e.g. by punching along a center portion or substantially central region of the metal plate.

Figure 6C:
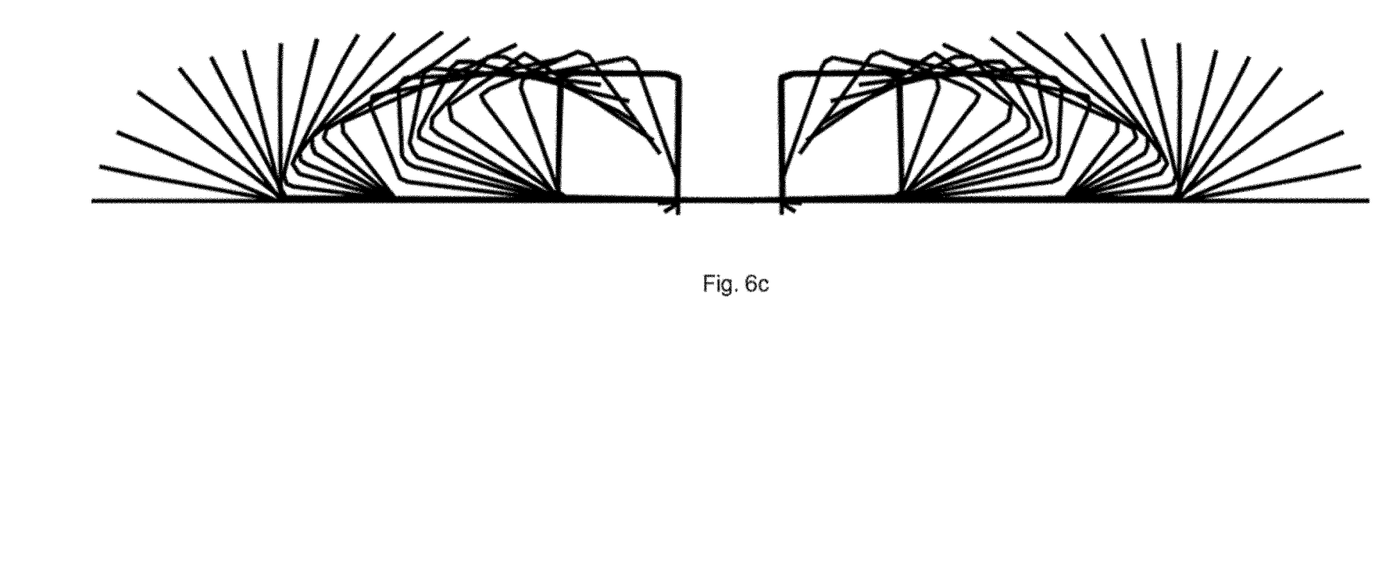
FIG. 6c schematically illustrates an example method of roll-forming a bumper beam according to the example of FIGS. 6a and 6b.

FIG. 6c schematically illustrates an example (example I of FIG. 6a) of how such a metal plate may be roll-formed to form a cross-member of a bumper. As the edges comprising the projections are folded towards the central portion of the plate, the projections come to face the corresponding holes. The projections may thus be introduced into the holes. Afterwards, the portions of the projections extending beyond the holes may be deformed. In the example shown in FIG. 6b, the projections are folded in opposite directions in an alternating manner.

Figure 7A:
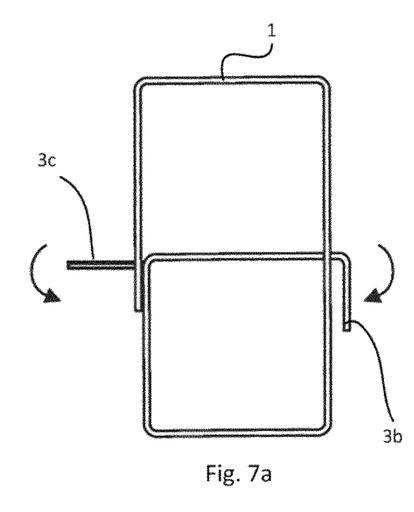
FIGS. 7a and 7b schematically illustrate different views of another example of a bumper beam.
Figure 7B:
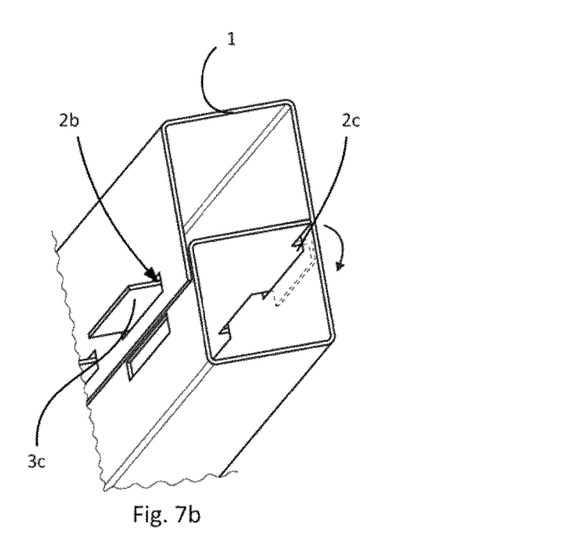

FIGS. 7a and 7b schematically illustrate different views of another example of a cross-member of a bumper. In this example, the cross-member may have substantially an "8"-shaped (eight-shaped) cross-section. The cross-member of this example may be formed from a single metal plate.

Projections 3b may be formed along a first edge of such a plate, whereas holes 2b may be formed along an opposite edge. Along a first substantially central portion of the plate, further projections 3c may be formed, by punching through the plate, but without removing the scrap metal, i.e. a cut may be made in the plate and a projection may be formed by pushing against the portion in the center of the cut. The cut however may not be complete, as the projection may still be attached to the plate along one edge.

Along another substantially central portion of plate 1, further holes 2c may be punched.

Roll-forming may be used to form a substantially closed 8-shaped cross-section. Central projections 3c may thus be introduced into edge holes 2b and edge projections 3b may be introduced into central holes 2c.

Figure 8:
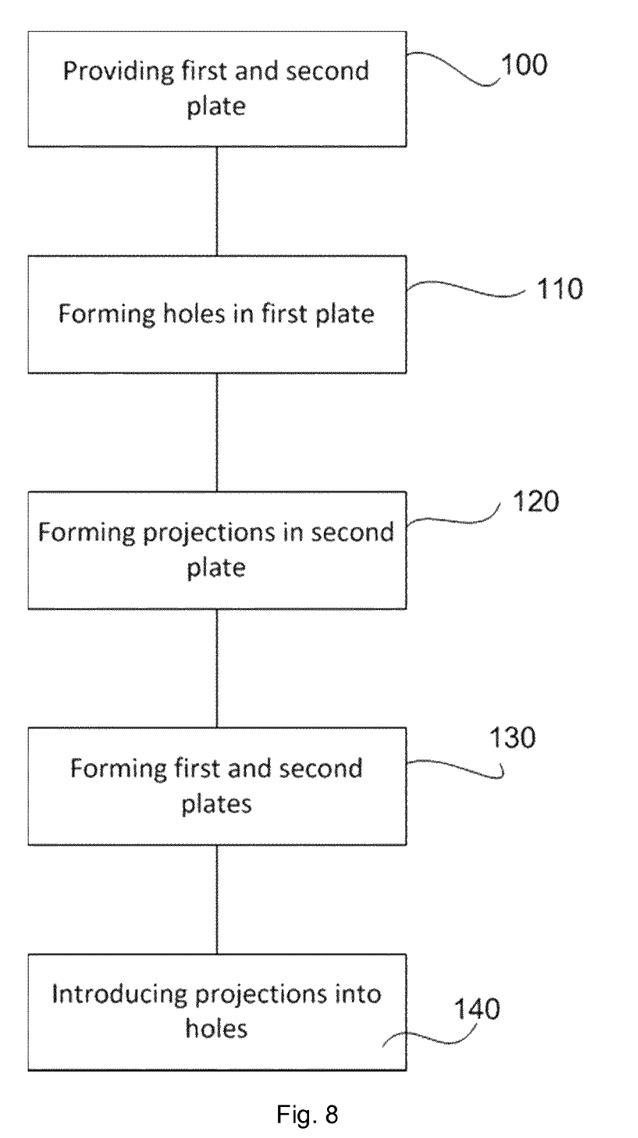
FIG. 8 shows a block diagram of an example of a method for forming a rocker panel according to an implementation.

FIG. 8 shows a block diagram of an example of a method for forming a rocker panel according to an implementation. At block 100, a first and second metal plate may be provided. These first and second metal plates in some implementations may be provided from two continuous webs of metals. The first and second metal plate may be of different material or otherwise different structural properties.

Holes may be formed in the first plate at block 110 and projections may be formed in the second plate at block 120. In an example, the first plate comprises holes along two opposing edges and the second plate comprises projections along two opposing edges. Introduction of projections into holes may thus form a closed cross-section.

In an alternative example, edge portions of both the first and second metal plates may comprise both projections and holes.

At block 130, the plates may be formed to suitable shapes, such that together they may form a closed cross-section, upon introduction of the projections in corresponding holes at block 140.

Figure 9:
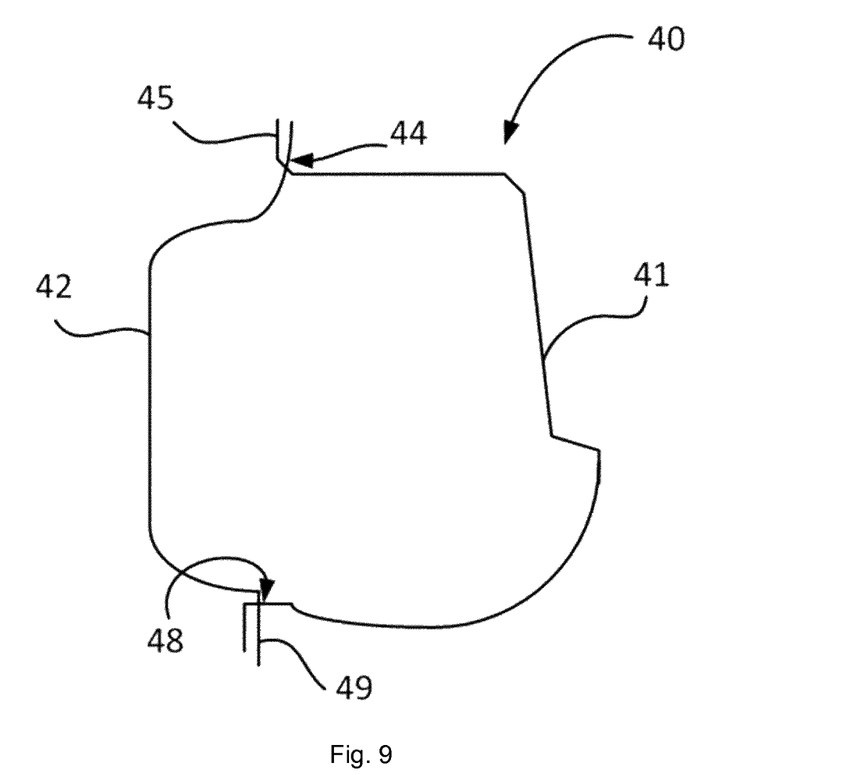
FIG. 9 schematically illustrates an example of a rocker panel according to an implementation.

FIG. 9 schematically illustrates a cross-section of an example of a rocker panel 40. The rocker panel 40 may be formed by a first plate 41 and a second plate 42. The plates may be mechanically joined, rather than being joined by welding. The first plate 41 and second plate 42 may have different properties, e.g. a different thickness or different material.

The first plate 41 may comprise holes 48 substantially along or near a first edge region, whereas it may comprise projections 45 along an opposite edge. The second plate 42 may comprise holes 44 substantially along a first edge, whereas it may comprise projections along an opposing edge region.

The projections 45 of the first plate may be introduced into corresponding holes 44 of the second plate and subsequently be deformed. The projections 49 of the second plate may be introduced into corresponding holes 48 of the first plate and subsequently be deformed.

Figure 10:
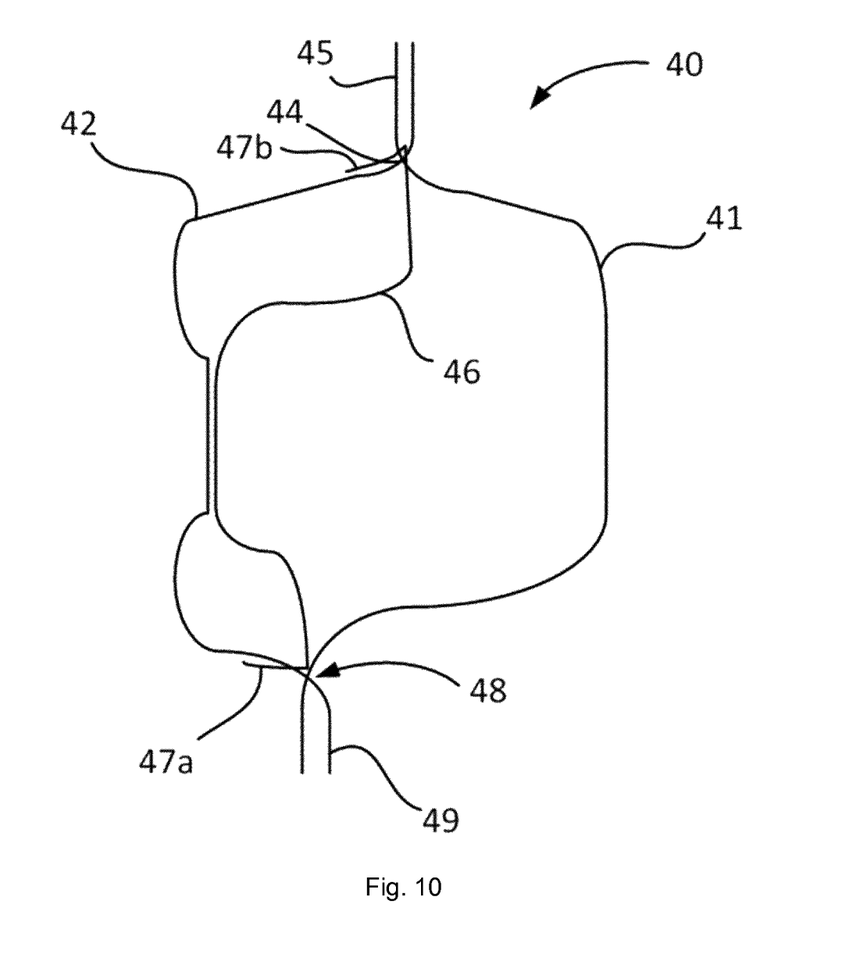
FIG. 10 schematically illustrates another example of a rocker panel according to another implementation.

FIG. 10 schematically illustrates a cross-section of another example of a rocker panel 40. The rocker panel 40 may be formed by a first plate 41 and a second plate 42. The plates may again be mechanically joined.

The first plate 41 may comprise holes 48 substantially along or near a first edge region, whereas it may comprise projections 45 along an opposite edge. The second plate 42 may comprise holes 44 substantially along a first edge, whereas it may comprise projections along an opposing edge region.

The projections 45 of the first plate may be introduced into corresponding holes 44 of the second plate and subsequently be deformed. The projections 49 of the second plate may be introduced into corresponding holes 48 of the first plate and subsequently be deformed.

In this example, the rocker panel 40 may comprise an inner reinforcement formed by an inner metal plate 46. The inner metal plate 46 may comprise projections 47a and 47b along opposing edges of the plate 46. In this example, the second metal plate 42 may comprise suitable holes in which the projections 47a and 47b may be inserted.

In an example of a manufacturing method, the second metal plate 42 may firstly be joined to the inner reinforcement plate 46. Subsequently, the first metal plate may be joined to the second metal plate.

For reasons of completeness, various aspects of the present disclosure are set out in the following numbered clauses:

Clause 1. A bumper beam having a closed cross-section, the closed cross-section being formed by one or more metal plates, wherein the metal plates comprise a plurality of holes and a plurality of projections, and wherein the projections engage with corresponding holes to retain the closed cross-section.

Clause 2. A bumper beam according to clause 1, wherein the closed cross-section is formed by a single metal plate.

Clause 3. A bumper beam according to clause 1, wherein the closed cross-section is formed by a first and a second metal plate, the first metal plate comprising the plurality of holes and the second metal plate comprising the plurality of projections.

Clause 4. A bumper beam according to clause 1, wherein the closed cross-section is formed by a first and a second metal plate, the first and the second metal plate both comprise a plurality of holes and a plurality of projections.

Clause 5. A bumper beam according to clause 3 or 4, wherein the first plate is of a first material and the second plate is of a different material.

Clause 6. A bumper beam according to any of clauses 3-5, wherein the first plate has a first thickness and the second plate has a different thickness.

Clause 7. A bumper beam according to any of clauses 1-6, wherein one or more of the plurality of projections extend through the corresponding holes and wherein a portion of the projections extending through the corresponding holes is bent.

Clause 8. A bumper beam according to clause 7, wherein
for a first set of projections, the portion of the projections extending through the corresponding holes is bent in a first direction and
for a second set of projections, the portion of the projections extending through the corresponding holes is bent in an opposite direction.

Clause 9. A bumper beam according to any of clauses 1-8, wherein one or more of the holes are substantially rectangular, the holes having a length substantially equal to a width of the corresponding projection and having a width substantially equal to a thickness of the corresponding projection.

Clause 10. A bumper beam according to any of clauses 1-9, wherein the closed cross-section is substantially rectangular.

Clause 11. A bumper beam according to any of clauses 1-9, wherein the closed cross-section is substantially "eight"-shaped.

Clause 12. A bumper beam according to any of clauses 1-9, wherein the closed cross-section has two separate substantially rectangular portions.

Clause 13. A bumper beam according to any of clauses 1-12, wherein the member is curved along its length.

Clause 14. A bumper beam according to clause 13, wherein a curvature of the cross-member is varied along its length.

Clause 15. A bumper beam according to any of clauses 1-12, wherein the member is substantially straight.

Clause 16. A bumper comprising a bumper beam according to any of clauses 1-15.

Clause 17. A vehicle comprises a bumper according to clause 16.

Clause 18. Method of manufacturing a bumper beam according to any of clauses 1-15, comprising
providing one or more metal plates,
forming a plurality of holes and forming a plurality of projections,
forming the metal plates to achieve a substantially closed cross-section, and
introducing the plurality of projections into the plurality of holes.

Clause 19. Method according to clause 18, wherein forming a plurality of holes comprises punching a plurality of holes.

Clause 20. Method according to clause 18 or 19, wherein forming a plurality of projections includes removing edge portions of at least one of the metal plates, such that the projections are formed by remaining edge portions.

Clause 21. Method according to any of clauses 18-20, wherein forming a plurality of projections includes cutting substantially central portions of at least one of the metal plates and deforming the central portions to form the projections.

Clause 22. Method according to any of clauses 18-21, wherein forming the metal plates to achieve a substantially closed-cross-section comprises roll-forming the metal plates.

Clause 23. Method according to any of clauses 18-22, wherein the metal plates are provided from a continuous roll of metal plate.

Clause 24. Method according to clause 23, further comprising cutting the continuous roll of metal plate to form the metal plates to size.

Clause 25. A rocker panel having a closed cross-section, the closed cross-section being formed by one or more metal plates, wherein
the metal plates comprise a plurality of holes and a plurality of projections, wherein the projections engage with corresponding holes to retain the closed cross-section.

Clause 26. A rocker panel according to clause 25, wherein the closed cross-section is formed by a first and a second metal plate, the first metal plate comprising the plurality of holes and the second metal plate comprising the plurality of projections.

Clause 27. A rocker panel according to clause 25, wherein the closed cross-section is formed by a first and a second metal plate, the first and the second metal plate both comprise a plurality of holes and a plurality of projections.

Clause 28. A rocker panel according to clause 26 or 27, wherein the first plate is of a first material and the second plate is of a different material.

Clause 29. A rocker panel according to any of clauses 26-28, wherein the first plate has a first thickness and the second plate has a different thickness.

Clause 30. A rocker panel according to any of clauses 25-29, wherein one or more of the plurality of projections extend through the corresponding holes and wherein a portion of the projections extending through the corresponding holes is bent.

Clause 31. A rocker panel according to clause 30, wherein
for a first set of projections, the portion of the projections extending through the corresponding holes is bent in a first direction and
for a second set of projections, the portion of the projections extending through the corresponding holes is bent in an opposite direction.

Clause 32. A rocker panel according to any of clauses 25-31, wherein one or more of the holes are substantially rectangular, the holes having a length substantially equal to a width of the corresponding projection and having a width substantially equal to a thickness of the corresponding projection.

Clause 33. A rocker panel according to any of clauses 25-32, wherein the closed cross-section is substantially rectangular.

Clause 34. A rocker panel according to any of clauses 25-33, comprising an inner reinforcement.

Clause 35. A rocker panel according to clause 34, wherein the inner reinforcement is formed by an inner metal plate, the inner metal plate comprising a plurality of holes and/or a plurality of projections, and wherein the inner metal plate is joined to the other metal plates by engagement of the holes and/or projections of the inner metal plate with the projections and/or holes of the other plates.

Clause 36. A vehicle comprising a rocker panel according to any of clauses 25-35.

Clause 37. Method of manufacturing a rocker panel comprising
providing a first metal plate and a second metal plate,
forming a plurality of holes in the first metal plate and forming a plurality of projections in the second metal plate,
forming the metal plates such that when they are joined a substantially closed cross-section is achieved, and
introducing the plurality of projections into the plurality of holes.

Clause 38. Method according to clause 37, wherein forming a plurality of holes comprises punching a plurality of holes.

Clause 39. Method according to clause 37 or 38, wherein forming a plurality of projections includes removing edge portions of at least one of the metal plates, such that the projections are formed by remaining edge portions.

Clause 40. Method according to any of clauses 37-39, wherein forming a plurality of projections includes cutting substantially central portions of at least one of the metal plates and deforming the central portions to form the projections.

Clause 41. Method according to any of clauses 37-40, wherein forming the metal plates to achieve a substantially closed-cross-section comprises roll-forming the metal plates.

Clause 42. Method according to any of clauses 37-41, wherein the first and/or second metal plates are provided from a continuous roll of metal plate.

Clause 43. Method according to clause 42, further comprising cutting the continuous roll of metal plate to form the first and/or second metal plate to size.

Although only a number of examples have been disclosed herein, other alternatives, modifications, uses and/or equivalents thereof are possible. In particular, the pitch of holes and projections may be freely varied in accordance with circumstances. Also many possible shapes may be chosen for the projections and holes. For example, the projections could be made triangular for any of the examples herein disclosed.

Furthermore, all possible combinations of the described examples are also covered. Thus, the scope of the present disclosure should not be limited by particular examples, but should be determined only by a fair reading of the claims that follow.

The invention claimed is:

1. A bumper beam, comprising:
a substantially eight-shaped closed cross-section, the closed cross-section being formed by a single metal plate,
wherein the metal plate comprises:
a plurality of projections, including first edge projections formed along a first edge of the plate and central projections formed along a first central portion of the plate, and
a plurality of holes, including second edge holes formed along a second edge of the plate opposite to the first edge, and central holes formed along a second central portion of the plate,
wherein the central projections engage with the corresponding second edge holes and the first edge projections engage with the corresponding central holes to retain the closed cross-section.

2. A bumper beam according to claim 1, wherein one or more of the first edge projections and central projections extend through the respective central holes and second edge holes and wherein a portion of the first edge projections and central projections extending through the respective central holes and second edge holes is bent.

3. A bumper beam according to claim 2, wherein
for a first set of the first edge projections and the central projections, the portion of the first edge projections and the central projections extending through the respective central holes and second edge holes is bent in a first direction and
for a second set of the first edge projections and the central projections, the portion of the first edge projections and the central projections extending through the respective central holes and second edge holes is bent in an opposite direction.

4. A bumper beam according to claim 1, wherein one or more of the central holes and the second edge holes are substantially rectangular, the holes having a length substantially equal to a width of the corresponding first edge projection and central projection and having a width substantially equal to a thickness of the corresponding first edge projection and central projection.

5. A bumper beam according to claim 1, wherein the bumper beam is curved along a length of the bumper beam.

6. A bumper comprising a bumper beam according to claim 1.

7. A vehicle comprising a bumper according to claim 6.

8. A method of manufacturing a bumper beam according to claim 1, comprising:
providing the plate,
forming a plurality of the first edge projections along the first edge of the plate,
forming a plurality of the second edge holes along the second opposite edge of the plate,
forming a plurality of the central projections along the first central portion of the plate, wherein the forming of the plurality of the central projections includes cutting the first central portion of the plate and deforming the first central portion to form the central projections along the first central portion,
forming a plurality of the central holes along the second central portion of the plate,
forming the plate to achieve the substantially eight-shaped closed cross-section, and
introducing the plurality of central projections into the plurality of second edge holes and the first edge projections into the central holes.

9. A method according to claim 8, wherein the forming a plurality of the first edge projections includes removing first edge portions of the plate, such that the first edge projections are formed by remaining first edge portions.

10. A method according to claim 7, wherein the forming a plurality of the second edge holes or the central holes comprises punching a plurality of holes in the plate.

11. A method according to claim 7, wherein the forming the plate to achieve the substantially eight-shaped closed-cross-section comprises roll-forming the plate.

12. A method according to claim 7, wherein the plate is provided from a continuous roll of metal plate.

13. A method according to claim 12, further comprising cutting the continuous roll of metal plate to form the plate to size.

* * * * *